(12) United States Patent
Brown et al.

(10) Patent No.: US 7,326,022 B2
(45) Date of Patent: Feb. 5, 2008

(54) TOW TRAILER ASSEMBLY

(76) Inventors: James C. Brown, 1735 Trotter Ct., Fort Wayne, IN (US) 46815; Esler C. Walker, Jr., 5829 Wiltshire Dr., Columbus, GA (US) 31909

( * ) Notice: Subject to any disclaimer, the term of this patent is extended or adjusted under 35 U.S.C. 154(b) by 285 days.

(21) Appl. No.: 11/068,091

(22) Filed: Feb. 28, 2005

(65) Prior Publication Data

US 2006/0115352 A1 Jun. 1, 2006

Related U.S. Application Data

(60) Provisional application No. 60/631,811, filed on Nov. 30, 2004.

(51) Int. Cl.
*B60P 1/24* (2006.01)
(52) U.S. Cl. ................. 414/483; 414/563; 280/656
(58) Field of Classification Search ........ 414/481–482, 414/483, 563; 280/656
See application file for complete search history.

(56) References Cited

U.S. PATENT DOCUMENTS

| | | | | |
|---|---|---|---|---|
| 2,616,580 A | * | 11/1952 | Olson | 414/685 |
| 3,684,113 A | * | 8/1972 | Roller | 414/621 |
| 3,900,119 A | * | 8/1975 | Olsen | 414/563 |
| 3,929,237 A | * | 12/1975 | Schaedler | 414/563 |
| 4,002,147 A | * | 1/1977 | Feterl | 119/60 |
| 4,046,398 A | * | 9/1977 | Dunwoody | 280/415.1 |
| 4,498,837 A | * | 2/1985 | Kooi et al. | 414/664 |
| 4,669,949 A | * | 6/1987 | Sutton | 414/814 |
| 4,699,558 A | * | 10/1987 | Hagge et al. | 414/458 |
| 4,749,324 A | * | 6/1988 | Rulison | 414/10 |
| 4,824,318 A | * | 4/1989 | Dones | 414/607 |
| 4,944,648 A | * | 7/1990 | Parr | 414/483 |
| 5,150,999 A | * | 9/1992 | Dugan | 414/24.5 |
| 5,207,444 A | * | 5/1993 | Tydeman | 280/441.1 |
| 5,326,128 A | * | 7/1994 | Cromley, Jr. | 280/656 |
| 5,387,001 A | * | 2/1995 | Hull et al. | 280/402 |
| 5,575,608 A | * | 11/1996 | Yau et al. | 414/607 |
| 5,584,639 A | * | 12/1996 | Walker, Jr. | 414/476 |
| 5,593,270 A | * | 1/1997 | Richards | 414/458 |
| 5,667,352 A | * | 9/1997 | Curtin et al. | 414/667 |
| 5,752,584 A | * | 5/1998 | Magoto et al. | 187/234 |
| 5,800,117 A | * | 9/1998 | Milton | 414/540 |
| 5,884,930 A | * | 3/1999 | Cluth | 280/497 |
| 5,897,286 A | * | 4/1999 | Whittaker | 414/607 |
| 6,086,082 A | * | 7/2000 | Andol | 280/414.1 |
| 6,543,566 B1 | * | 4/2003 | Mason | 180/209 |
| 2002/0172581 A1 | * | 11/2002 | Maney | 414/462 |
| 2003/0180132 A1 | * | 9/2003 | Morreim | 414/458 |
| 2005/0008461 A1 | * | 1/2005 | Herdrich | 414/24.5 |

* cited by examiner

*Primary Examiner*—Saul Rodriguez
*Assistant Examiner*—Joshua I Rudawitz
(74) *Attorney, Agent, or Firm*—Susan L. Firestone; Paul W. O'Malley (57) ABSTRACT

A modular tow trailer assembly tows cargo behind a motor vehicle. A base assembly pivotally connects to a fork assembly. A hydraulic lifting cylinder moves the wheels downward relative to the fork assembly to raise the fork assembly into a towing position with the load substantially centered over the trailer's wheels. The tow trailer is readily partially disassembled for fitting within a cargo container and transporting within a cargo carrier in field conditions.

11 Claims, 13 Drawing Sheets

TOW TRAILER ASSEMBLY

PRIORITY

The present application claims the benefit of U.S. Provisional Application No. 60/631,811 filed on Nov. 30, 2004.

BACKGROUND OF THE INVENTION

1. Field of the Invention

The present invention relates to a tow trailer for transporting cargo.

2. Description of the Prior Art

Cargo is often transported and stored on pallets or in large cargo or shipping containers. Pallets are typically of a standard construction having two flat wooden platforms with wooden spacers therebetween creating a gap of several inches. The forks of a forklift may be inserted into this gap to lift the pallet and any materials thereon. Material on pallets or in shipping containers is typically transported by loading a number of pallets onto a large flatbed truck using a forklift, driving the loaded truck to the point of destination, and unloading the pallet by forklift at the destination. This method of transport is efficient for large numbers of pallets, but requires forklifts at both the point of origin and the delivery point, and a flatbed truck for transporting the pallet.

A variety of applications exist for the economical transport of a single pallet of material. In the landscaping business, for example, sod is generally purchased by the pallet. Standard truck-and-forklift delivery methods are acceptable when the particular landscaping project requires a number of pallets of sod; however, many landscaping projects arise requiring only a single pallet of sod, or less. Because of the considerable expense involved, the transport of a single pallet of material is generally cost-prohibitive using existing transport methods.

For a variety of reasons, existing prior art devices capable of transporting a single pallet of material are less than entirely satisfactory. Many of these devices cannot comply with Department of Transportation ground clearance regulations (eleven (11) inches minimum) for load carrying. Other devices have a lifting platform pivotally connected behind its wheel assembly, resulting in an unstable towing configuration.

The device shown in U.S. Pat. No. 5,584,639 to Walker, Jr. solves many of the above problems and is incorporated in its entirety by reference herein. The weight of the load is centered over the wheels or slightly in front of the wheels for a safe and stable towing configuration. The device also provides adequate ground clearance during load carrying.

The '639 trailer, however, has a number of problems. The '639 trailer is rigid and gives the cargo a bumpy ride during transport. The '639 trailer also is not modular and cannot be readily disassembled. Once the '639 trailer is assembled, it is too big to be shipped with the rest of the cargo and too difficult to disassemble during field use. The '639 trailer cannot easily fit into cargo planes and shipping containers.

The '639 trailer cargo carrying capacity is not adjustable. The '639 trailer cannot carry a variety of sizes of pallets and shipping containers, especially tall cargo, and is limited to loads with short heights. Furthermore, the standard trailer hitch used on the '639 trailer cannot easily hook up to larger vehicles, such as a Humvee or larger cargo truck.

It would, therefore, be advantageous to have a modular tow trailer that can transport cargo at one location, then the tow trailer can be partially disassembled to a compact size and transported with the rest of the cargo to a second location. It would be further advantageous to have the partially disassembled tow trailer fit within a cargo container.

A further need exists for a modular tow trailer capable of transporting larger pallets or cargo without the need for forklifts or a large flatbed truck. Additionally, a need exists for a modular tow trailer capable of lifting a pallet of material a distance above the ground sufficient to comply with Department of Transportation ground clearance regulations without tilting the load so far beyond the horizontal position that the cargo falls off of the pallet. Moreover, a need exists for a modular tow trailer which allows the load to be centered over the wheels of the trailer or slightly forward of the wheels, such that the loaded device is stable when towed.

SUMMARY OF THE INVENTION

According to the invention, a modular tow trailer of the invention is used with a motor vehicle. The tow trailer has a base assembly, a fork assembly, a backstop, a wheel assembly and a hitch. The base assembly has a cross base between a pair of parallel base arms. Each base arm releasably engages the wheel arm of a wheel assembly. The wheel arm partially extends from a sleeve.

The fork assembly has a pair of parallel diagonal fork braces, fork receivers connected to the fork braces, and a fork cross tie between the fork receivers. Each fork receiver removably engages a fork.

The backstop has a pair of uprights mounted to the fork receivers. A horizontal tie down releasably connects to the uprights.

A spring slider has a slider cylinder slidingly engaging a pivot bar and attached to a spring bar. A leaf spring having a plurality of leaves attaches to each base arm. The unattached leaf spring end is located above the spring slider.

The opposite lateral ends of a pivot axle having rotatingly engage the base arms. A pivot axle support mounts to the fork receivers and rotatingly engages the pivot axle.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Turning to the figures where like reference numerals refer to like structures, a modular tow trailer 10 hitches to a motor vehicle 12 with an adjustable hitch 14 to transport pallets and cargo containers. The tow trailer 10 includes a base assembly 18, a fork assembly 16, a wheel assembly 22 and a backstop 20. In this disclosure, the term "modular" refers to the ability of a tow trailer operator to at least partially disassemble and reassemble the tow trailer under field conditions.

The fork assembly 16 has a fork cross tie 28 between parallel horizontal right 24 and left 25 fork receivers. A lower bracket support 30 connects to the center of the hitch 14 and to the fork cross tie 28. A diagonal fork brace 31 extends from each fork receiver 24, 25 to the hitch 14.

Forks 32 releasably matingly engage the fork receivers 24, 25. The fork 32 can include a head 34 with a split tail 36 projecting from the head 34. The tail 36 slides into the open back end 26 of a fork receiver 24 and into channels 38 within the fork receiver 24. Once the fork 32 is in place with the head 34 projecting from the fork receiver 24, the fork 32 can be locked in position with a fork lock 84, such as a locking pin 42 extending through fork apertures 44, 45 in the fork receiver 24 and fork 32. A handle 46 can attach to one end of the locking pin 42. The locking pin 42 can include screws, bolts, pins, and the like. The tip of each head 34 can be chamfered to allow the forks 32 to smoothly engage the cargo.

The base assembly 18 has a base frame 48 with parallel base arms 50 and a cross base 52 therebetween. The base arms 50 are arranged outside of the fork receivers 24, 25 at a distance sufficient to allow clearance for a cargo loaded on the fork receivers 24, 25. The cross base 52 is disposed horizontally above and essentially parallel to the fork cross tie 28 of the fork assembly 16. Ribs 54 project from the top of the base frame 48. A base conduit 56 can be located beneath the base frame 48. An upper bracket 170 attaches to the center of the cross base 52.

Each base arm 50 has an open base end 58 and wheel chamber 60 for releasably matingly engaging a wheel arm 112. A base hole 62 in the base arm 50 matingly engages a wheel lock 64, such as a locking pin 66 and handle 67.

Figure 19:
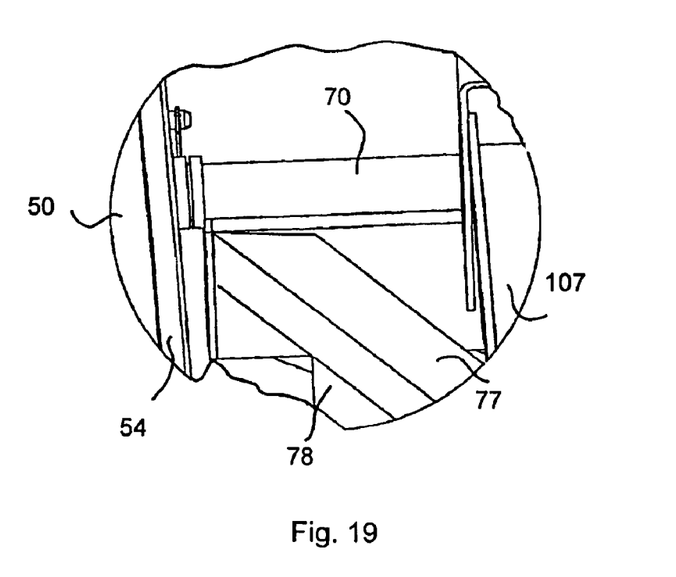
FIG. 19 is a partial close-up front perspective view of the pivot axle, axle support and diagonal backstop brace at the right side of the tow trailer as shown in circle D of FIG. 7 and rotated approximately 90° downward and viewed toward the back.
Figure 20:
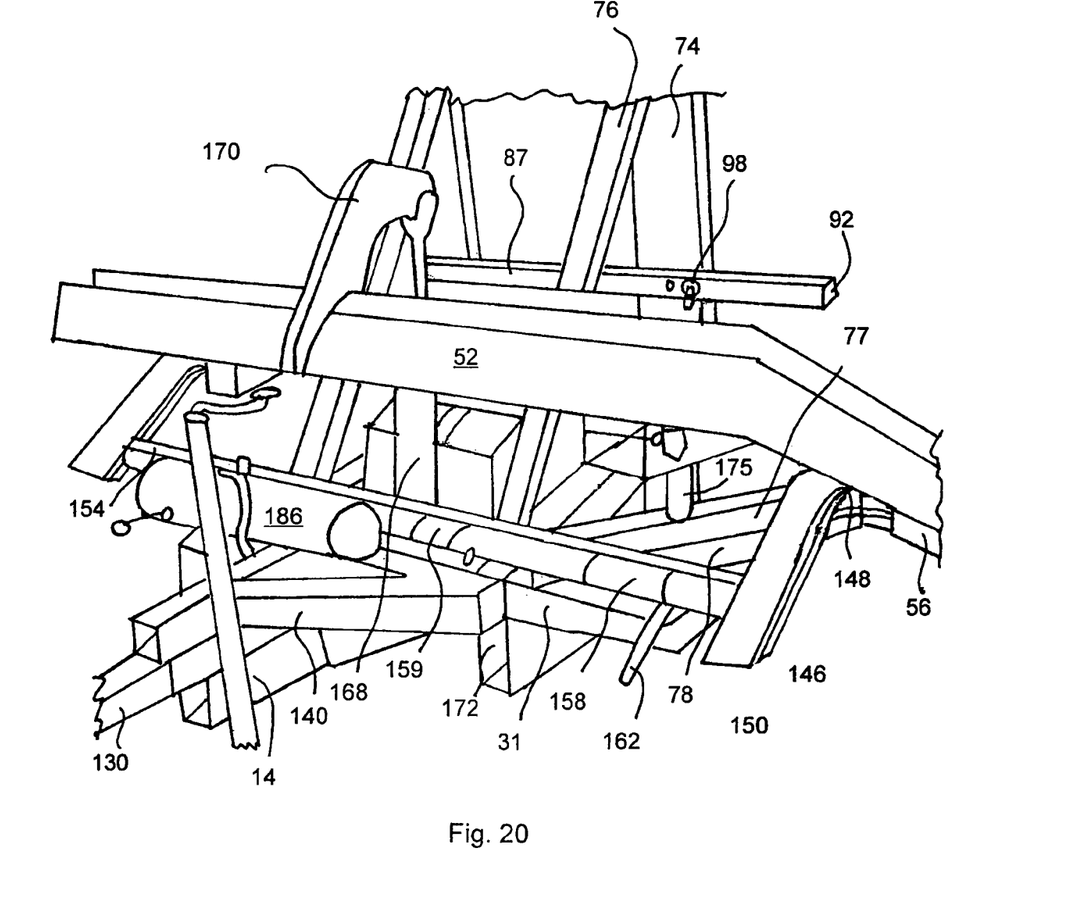
FIG. 20 is a partial front perspective view of the tow trailer of the invention in the up position.

Each end of a pivot axle 70 matingly engages one of the base arms 50, preferably through an axle aperture 68. (FIG. 19.) The pivot axle 70 ends can be capped. The pivot axle 70 passes through axle support frames 104 rising vertically from the intersection of each fork receiver 24, 25 and corresponding diagonal fork brace 31 forward the backstop 20. Each axle support frame 104 has vertical 106, horizontal 107 and diagonal 108 axle supports, with an optional supplemental vertical axle support 109 located forward the vertical axle support 106. The supplemental vertical axle support 109 is preferably hollow to engage a tongue 130 for the hitch 14 when not in use. The axle support frames 104 can be attached by welding or bolting to backstop braces 80.

The backstop 20 has at least one cross beam 72 connecting a pair of uprights 74. Preferably, the bottom of each upright 74 mounts to the top of the corresponding fork receiver 24, 25 behind the diagonal fork brace 31 of the fork assembly 16. The front of each upright 74 can attach to a vertical axle support 106. If desired, the height of the backstop 20 can be adjusted using inner uprights and outer upright shells slidably engaging each other and locking in position with a lock, such as a pin inserted within matingly engaging apertures within the upright and upright shell (not shown).

Figure 17:
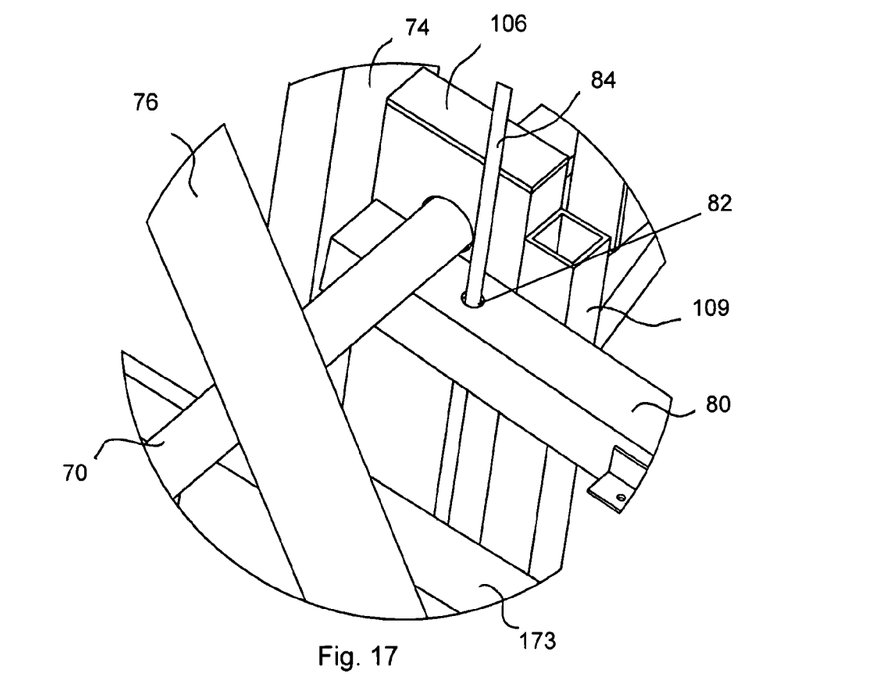
FIG. 17 is a partial perspective close-up view of the axle support, an upright and a horizontal backstop brace viewed from the center of the tow trailer over an upright brace and facing toward the left side of the trailer as shown in circle B of FIG. 7 and rotated from a top plan view downward toward the left side of the tow trailer.

A pair of horizontal backstop braces 80 preferably secure between the upper forward end of each diagonal fork brace 31 and the corresponding upright 74. Alternatively, the horizontal backstop brace 80 can secure at hitch 14 or at the junction of the hitch and the diagonal fork brace 31. Each horizontal backstop brace 80 has a nub 81 projecting from the top of the brace and bores 82 in the top of the brace for receiving at least part of a fork lock 84. (FIG. 17.)

Figure 18:
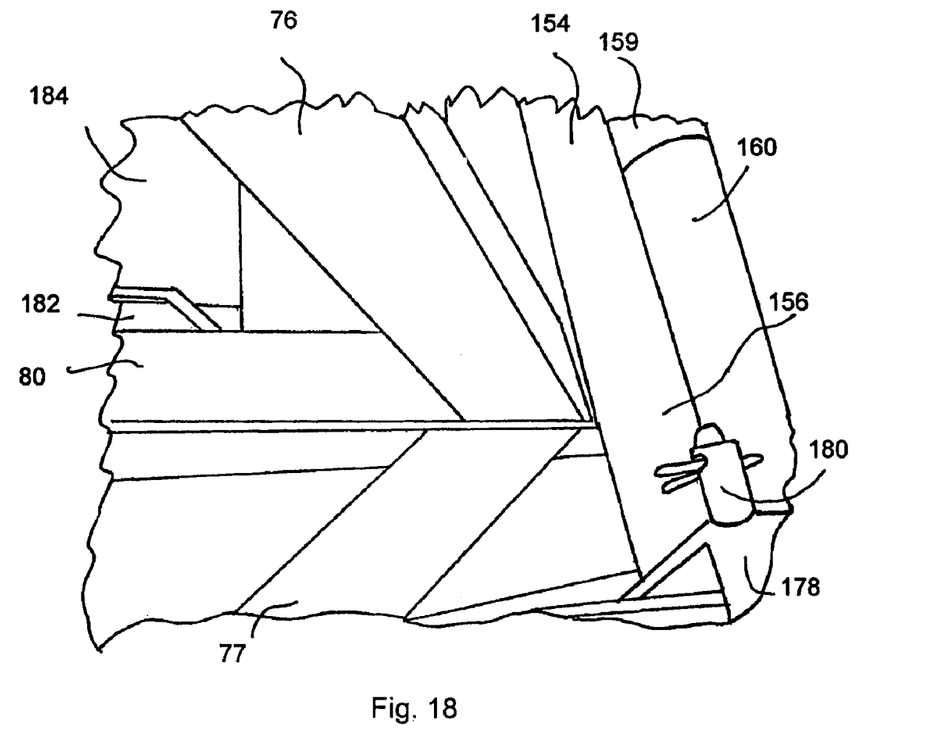
FIG. 18 is a partial close-up perspective view of the upright brace, the diagonal backstop brace and the spring slider engaging the horizontal backstop brace viewed over the right wheel channel toward the center of the tow trailer as shown in circle C of FIG. 7 and rotated approximately 90° downward and viewed toward the left side of the tow trailer.

Optional upright, braces 76 can extend from the top of the horizontal backstop braces 80 to the uprights 74. (FIG. 18.) Diagonal backstop braces 77 extend from the lateral side of the horizontal backstop braces 80 to the lateral side of the axle support frame 104. Backstop conduit 78 can attach beneath the diagonal backstop brace 77 (FIG. 19) and opens to the base arm conduit 56 through which electrical and/or hydraulic means thread.

Horizontal upper 86 and lower 87 tie downs attach to the center and the top of the backstop 20. Tie down sliders 88 have a stem 90 that fits within the open ends 92 of the tie downs 86, 87, and a lateral plate 94 projecting outwardly from the stem 90. A fastener with a hook or eyelet can fasten the lateral plate 94 to the stem 90.

A tie down lock 98 locks the tie downs 86, 87 to the uprights 74. The tie down lock 98 can be spring loaded and can include a locking pin 100 surrounded by a spring 101. One end of the locking pin 100 can pass through a pin bore 102 in the tie down 86, 87 and the other end connected to a handle 103.

When fully assembled for use transporting cargo, a wheel assembly 22 releasably engages the base assembly 18. Each wheel assembly 22 has an outer sleeve 110 partially enclosing a wheel arm 112. A first end 114 of the wheel arm 112 inserts within the open end 58 of a base arm 50 of the base assembly 18 and is locked with a wheel lock 64, such as a locking pin with handle matingly engaging a wheel hole 63 and base hole 62. A wheel axle 116 attaches to wheel 117 and rotatingly engages the partially enclosed wheel arm 112 and the sleeve 110. A wheel handle 118 projects from the top of the sleeve 110. Wheel conduit 120 is located beneath the sleeve 110. A fender frame 122 attaches to the sleeve 110 and a fender 124. A light 126 attaches to the fender 124. The wheel assembly 22 can also include brakes.

One end of a wheel channel 176 rests on the pivot axle 70. The wheel channel 176 is supported on the diagonal backstop brace 77 with the connector 175. U-shaped channel stops 178 are located on each end of the wheel channel 176. A wheel channel lock 180 matingly engages at least one of the channel stops 178, such as a stop bore through which a locking pin extends and the wheel hole 63 of the wheel arm 112.

Open right and left fork storage receptacles 172, 173 mount to the top of the fork cross ties 28 medial to the backstop's vertical uprights 74 and extend forward toward the hitch 14. A storage lock 174 engages each storage receptacle, such as a locking pin 141 with handle 143 matingly engaging at least one hole in the storage receptacle 172 and the fork 32 when the fork 32 is not in use.

A battery receiver 182, such as a shelf or a box, spans the tops of the storage receptacles 172. A battery 184 within the battery receiver 182 is prevented from shifting by a battery locking device 186, such as a tie, chain, cord, bracket, brace, and the like. Wiring connects the battery 184 to a hydraulic pump 186, preferably through conduit. The battery 184 can also be wired to the lights 126 on the fenders 124.

A height adjustable hitch 14 has a plurality of hitch openings 128 for receiving a tongue 130. The hitch 14 has a plurality of tongue receivers 132, 133, 134 stacked vertically. Diagonal hitch members 140 attach to a transverse hitch member 142 and one of the tongue receivers, preferably the top tongue receiver 132. The transverse hitch member 142 attaches to the horizontal backstop braces 80 and one of the tongue receivers, preferably the top tongue receiver 132. Alternatively, the transverse hitch member 142 can attach to the diagonal fork braces 31.

A hitch extension 190 composed of an extension body 200 with a plurality of stacked extension tongue receivers 192, 193, 194 matingly engages one of the tongue receivers of the hitch 14 and is releasably locked in place with a hitch lock 148. An extension projection 198 projects outwardly from an extension foundation 196 of the hitch extension body 200 and matingly engages one of the tongue receivers of the hitch 14. Extension legs 202 are between the tongue receiver 194 and extension foundation 196. The hitch extension 190 can have brackets.

The hitch end 144 of the tongue 130 inserts into one of the tongue receivers of the hitch 14 or hitch extension 190 opposite the vehicle end 145. The tongue 130 locks to the hitch 14 or hitch extension 190 with a hitch lock 148, which can include a locking pin 136 inserted through an aperture 138, 139 within the tongue receiver and tongue 130. A chain 204 extending from the tongue and/or the vehicle further locks the tongue 130 and hitch 14 together by wrapping around the hitch and fastening to the locking pin. The hitch therefore adjusts for a variety of heights to engage the rear of the motor vehicle, such as a car, Humvee or cargo truck used as a tow vehicle.

Figure 1:
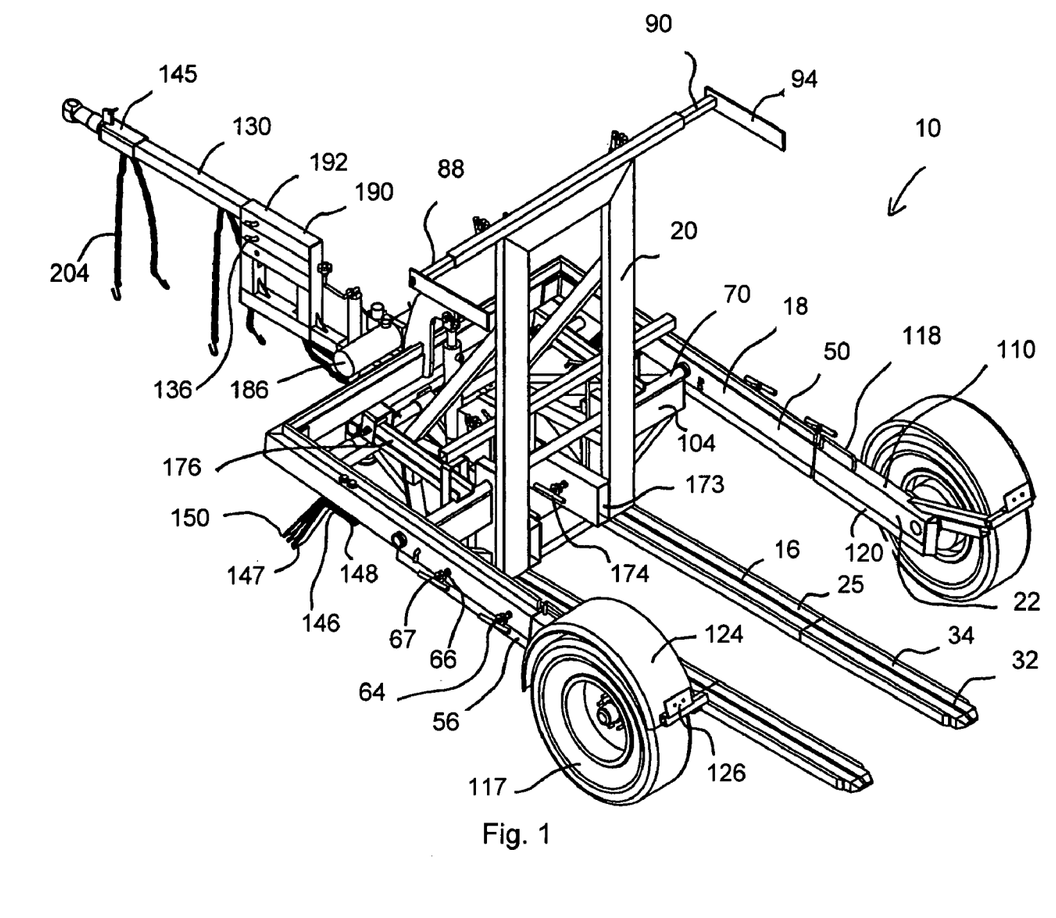
FIG. 1 is a perspective view of an assembled tow trailer of the invention.
Figure 2:
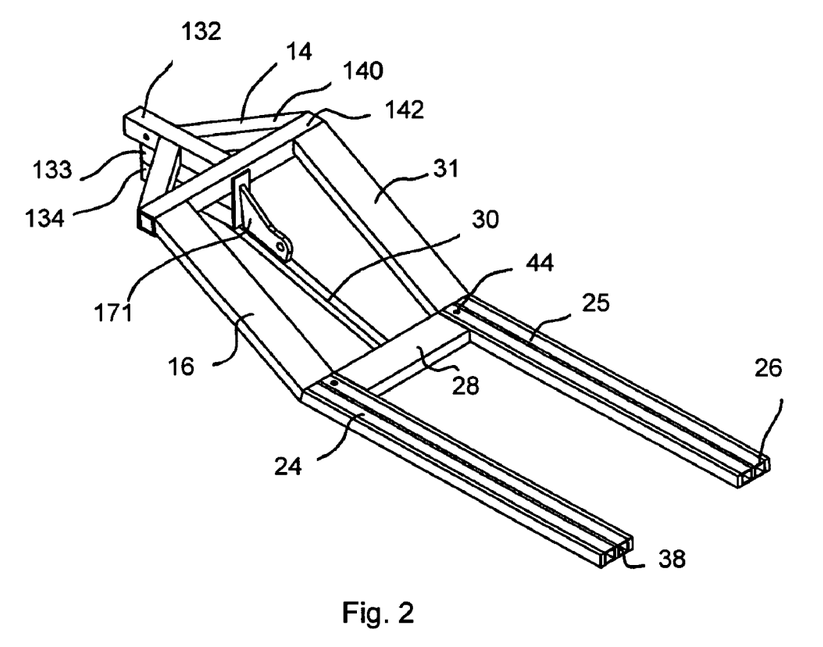
FIG. 2 is a perspective view of a fork assembly and hitch of the tow trailer of the invention.
Figure 3:
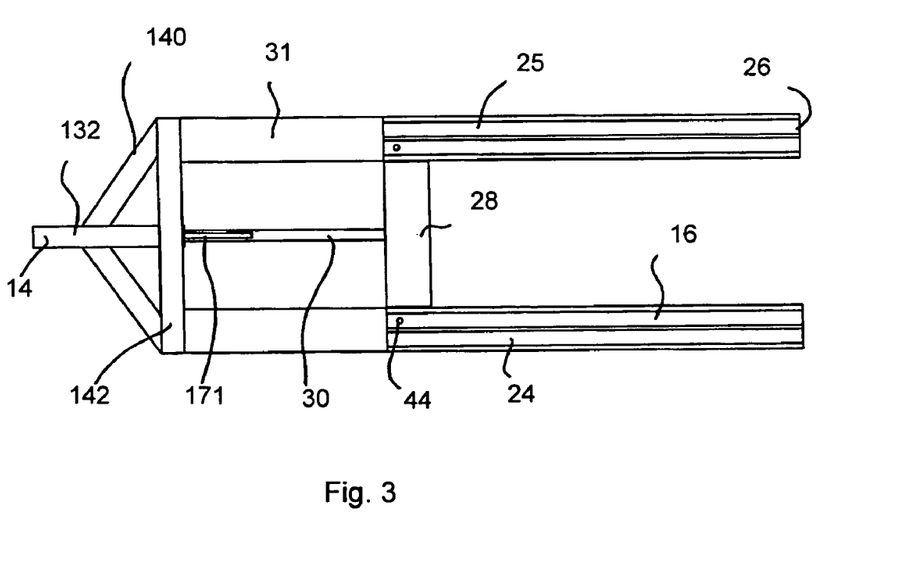
FIG. 3 is a bottom plan view of a fork assembly and hitch of the tow trailer of the invention.
Figure 4:
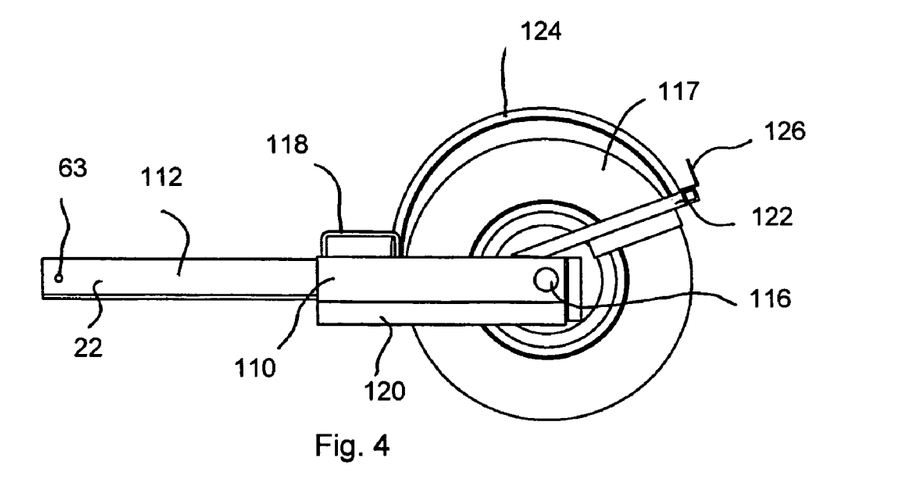
FIG. 4 is a side view of a wheel assembly of the tow trailer of the invention.
Figure 5:
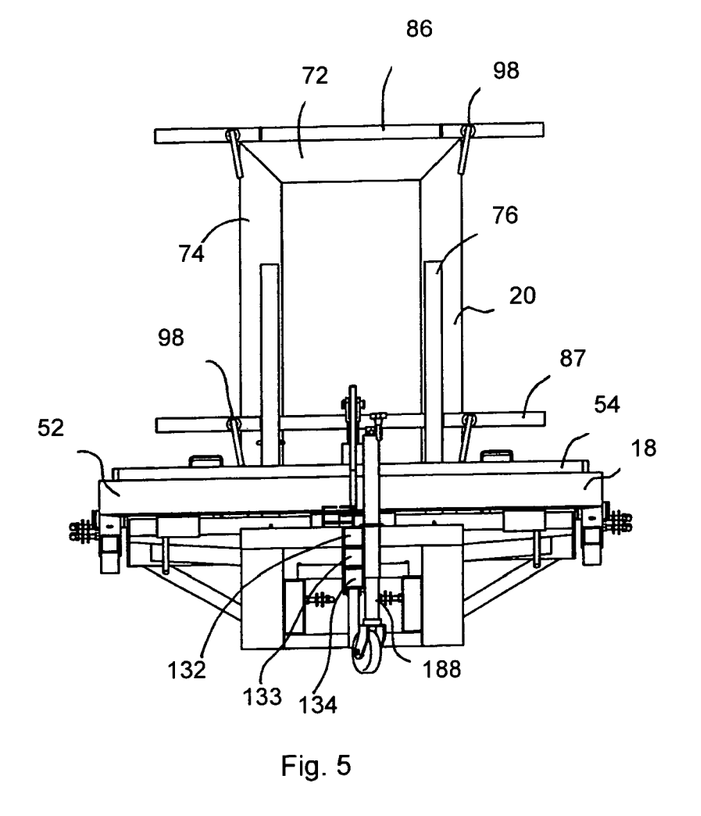
FIG. 5 is a front plan view of the tow trailer of the invention without the wheel assembly or fork.
Figure 6:
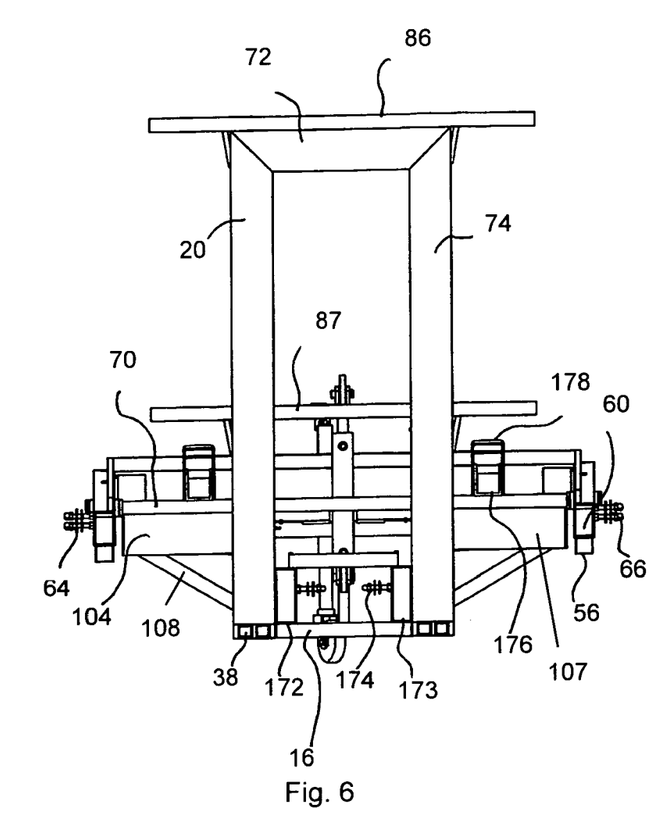
FIG. 6 is a rear plan view of the tow trailer of the invention without the wheel assembly or fork.
Figure 7:
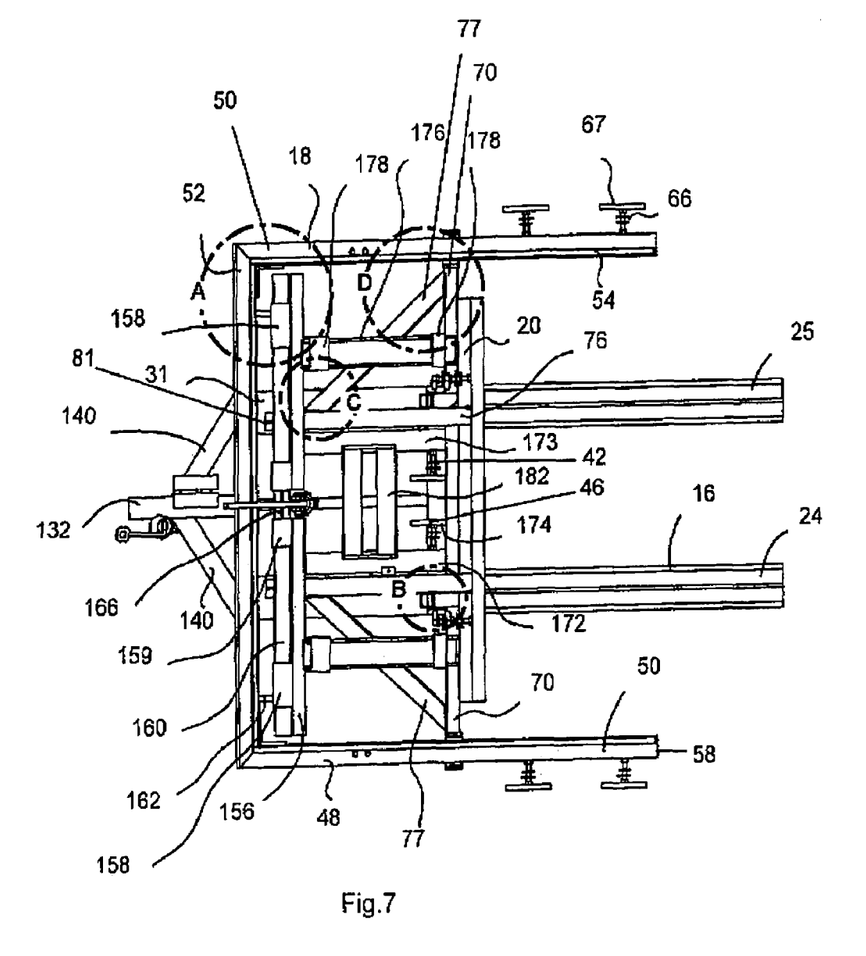
FIG. 7 is a top plan view of the tow trailer of the invention without the wheel assembly or fork.
Figure 8:
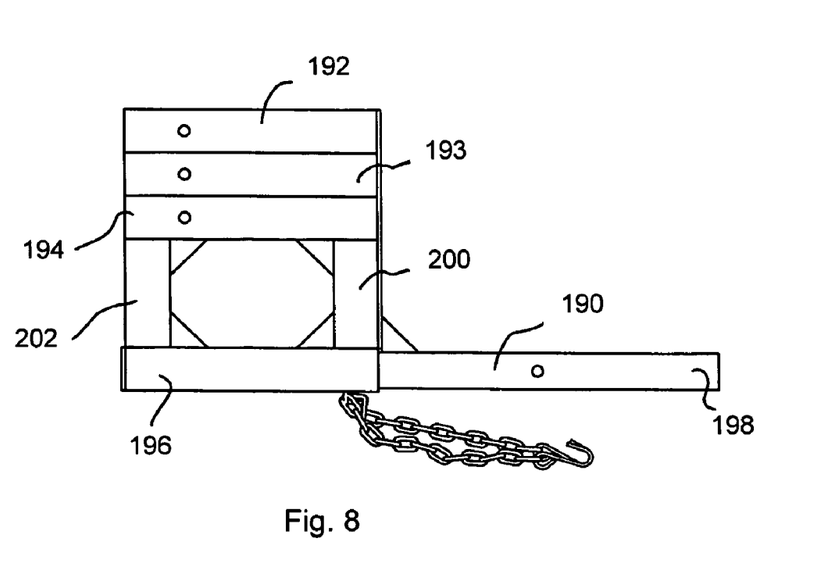
FIG. 8 is a side view of the hitch extension for the tow trailer of the invention.
Figure 9:
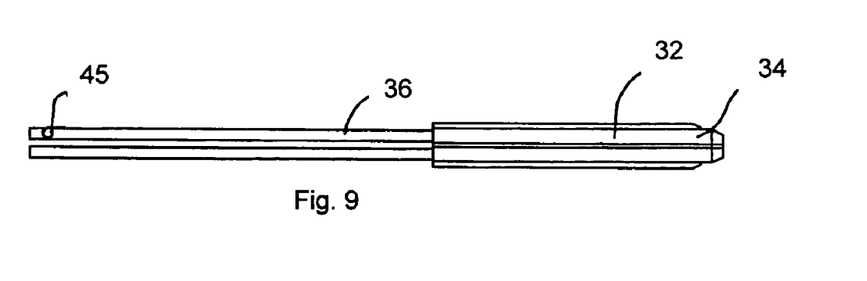
FIG. 9 is a top plan view of the fork for the tow trailer of the invention.
Figure 10:
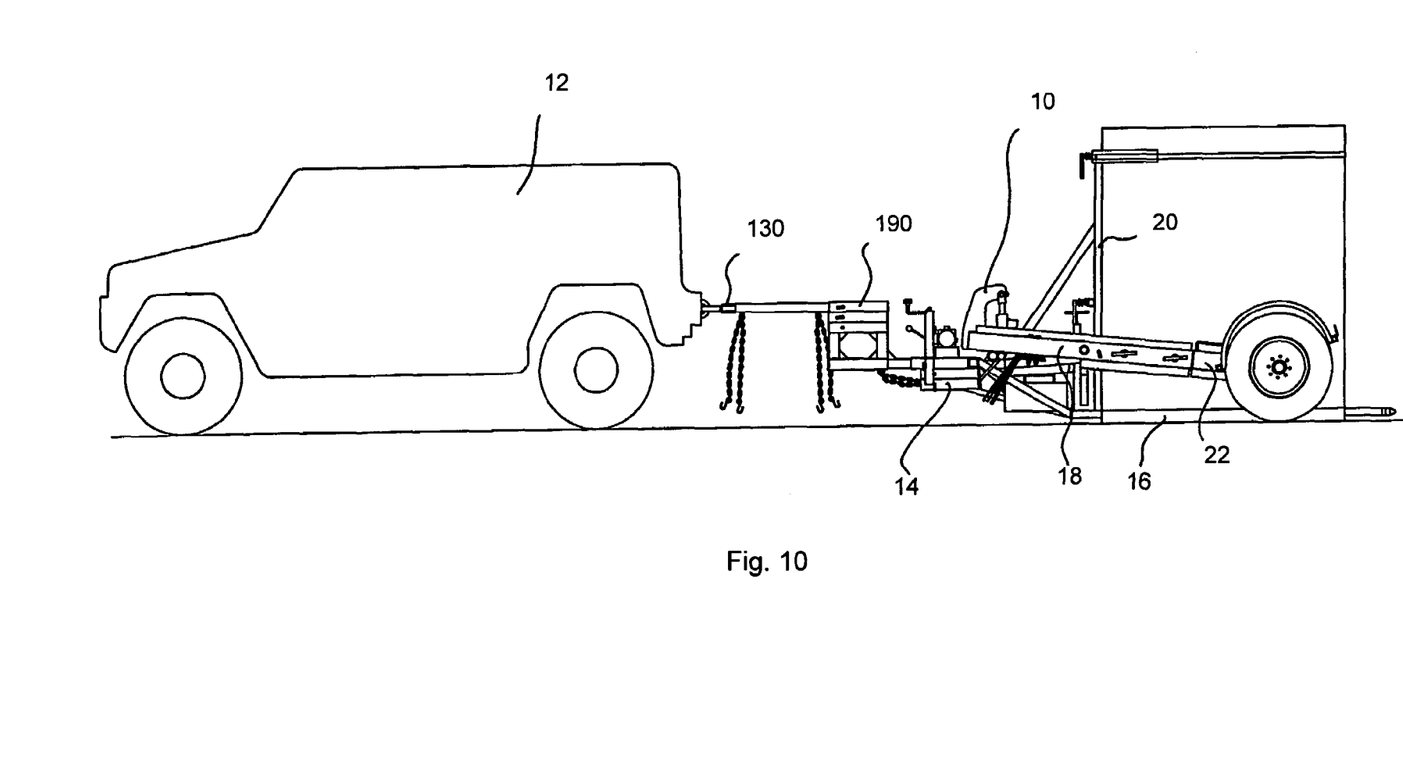
FIG. 10 is a side view of the tow trailer of the invention loaded and in the lower position.
Figure 11:
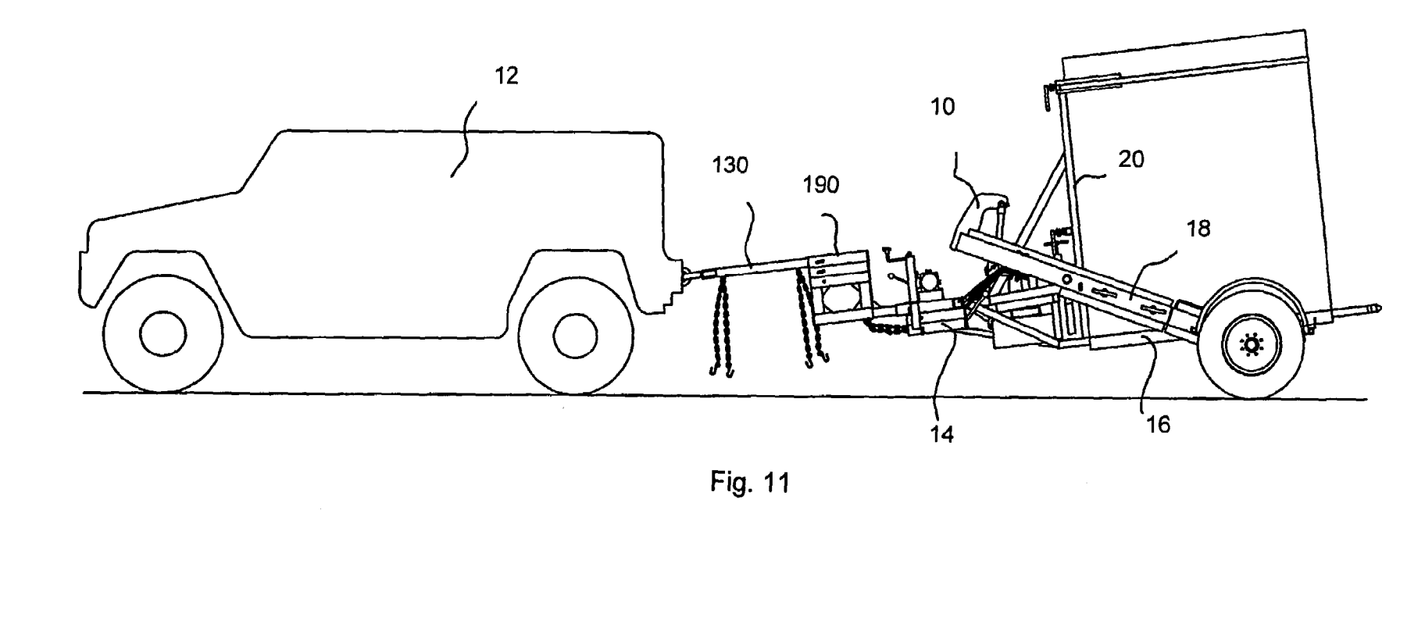
FIG. 11 is a side view of the tow trailer of the invention loaded and in the raised position for transport.
Figure 12:
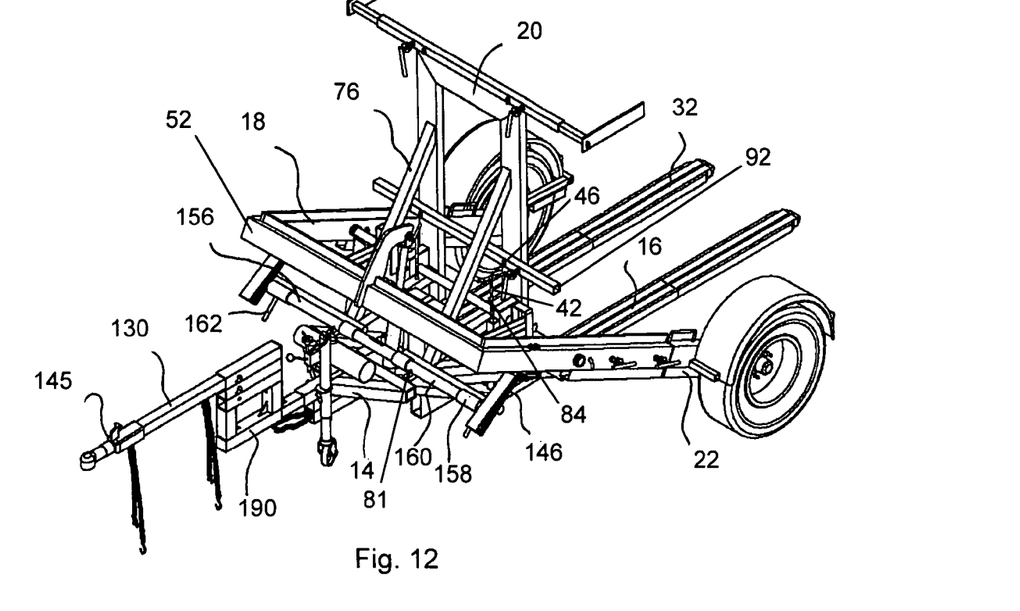
FIG. 12 is a perspective view of the tow trailer of the invention in the upper position.
Figure 13:
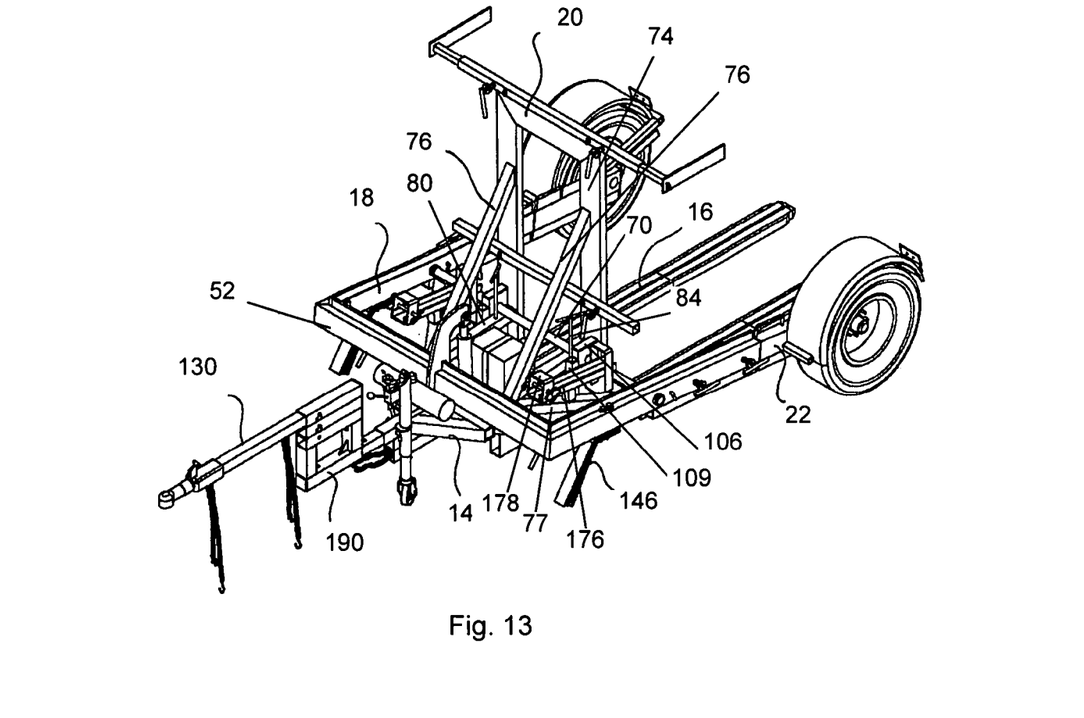
FIG. 13 is a perspective view of the tow trailer of the invention in the lower position.
Figure 14:
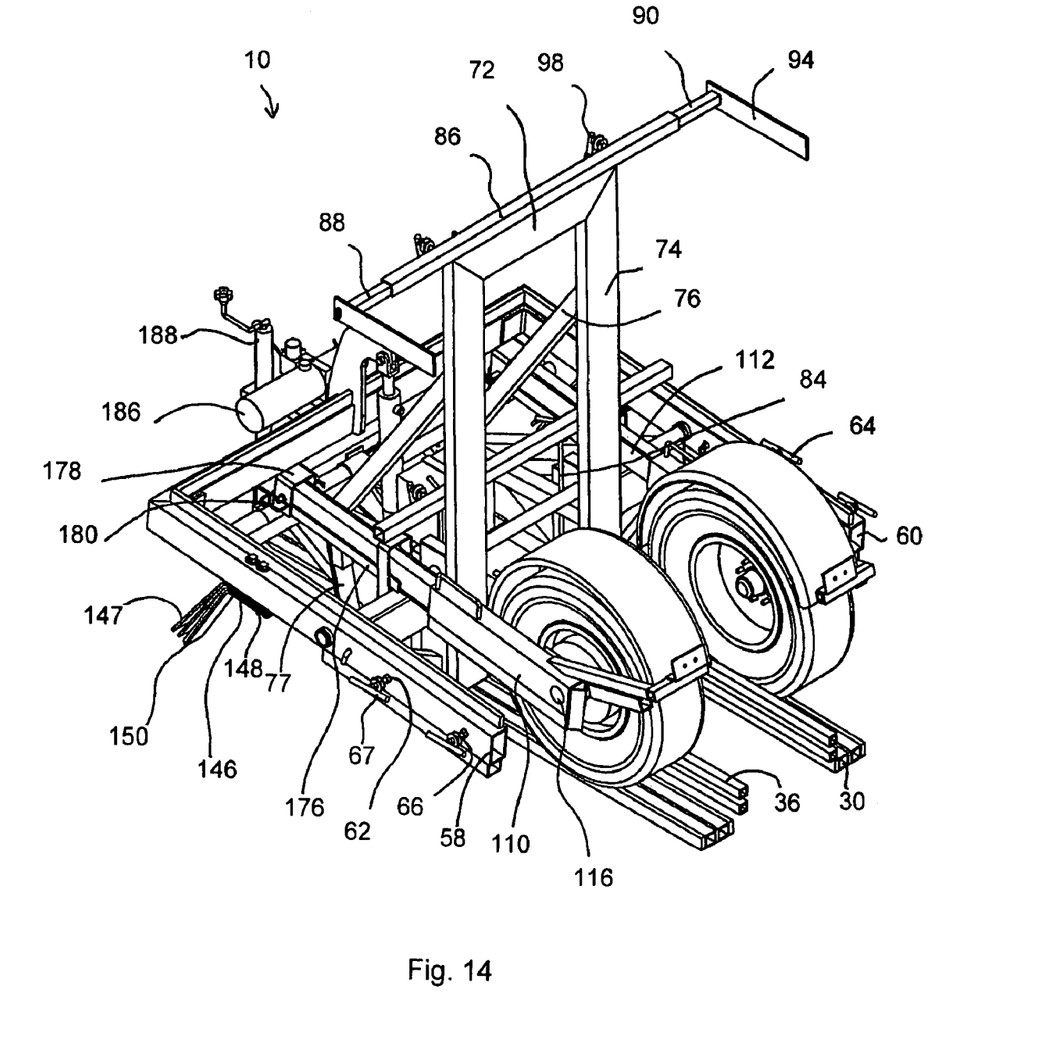
FIG. 14 is a perspective view of the tow trailer of the invention partially disassembled and ready for shipping.
Figure 15:
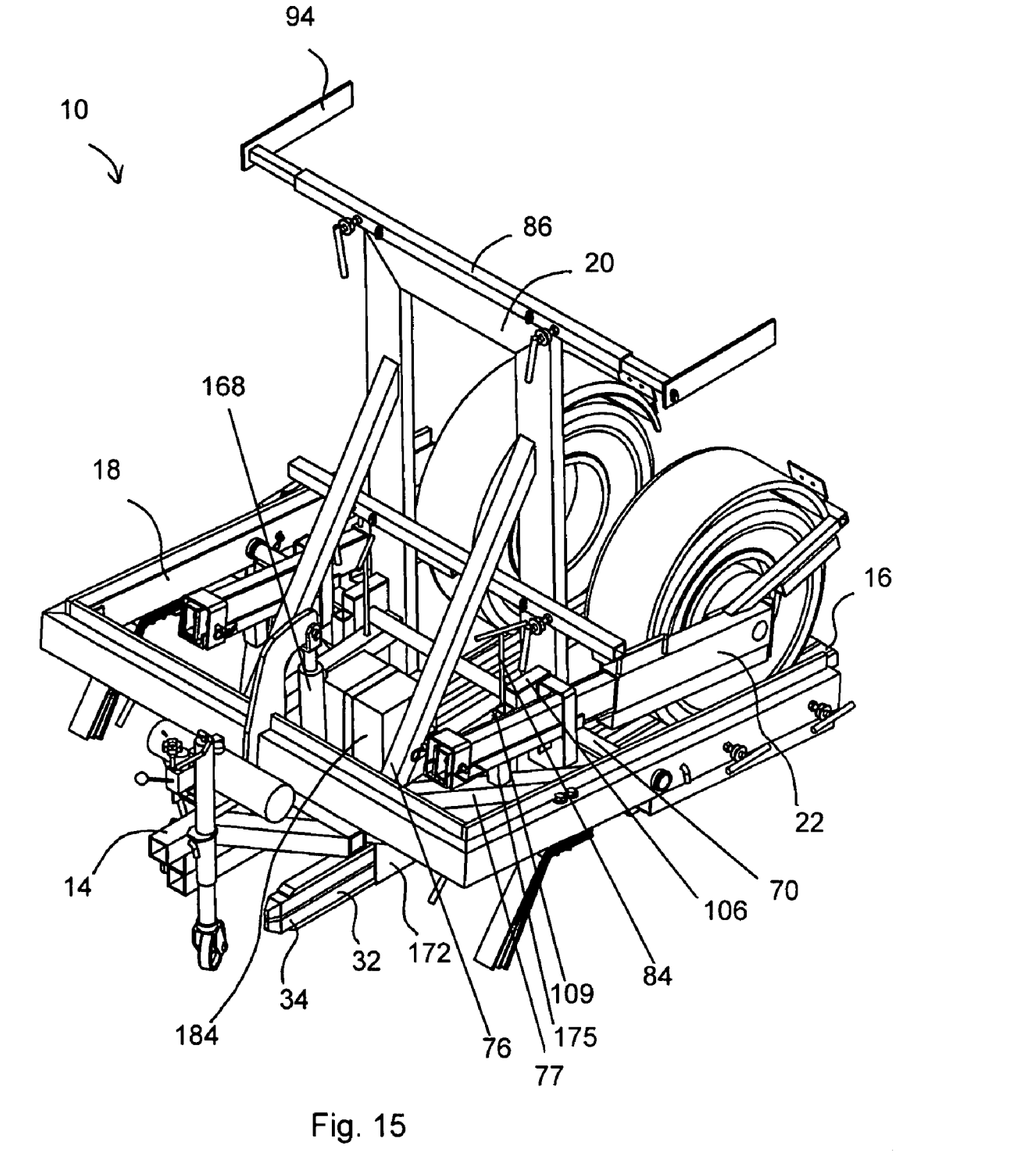
FIG. 15 is a front perspective view of the tow trailer of the invention partially disassembled and ready for shipping.
Figure 16:
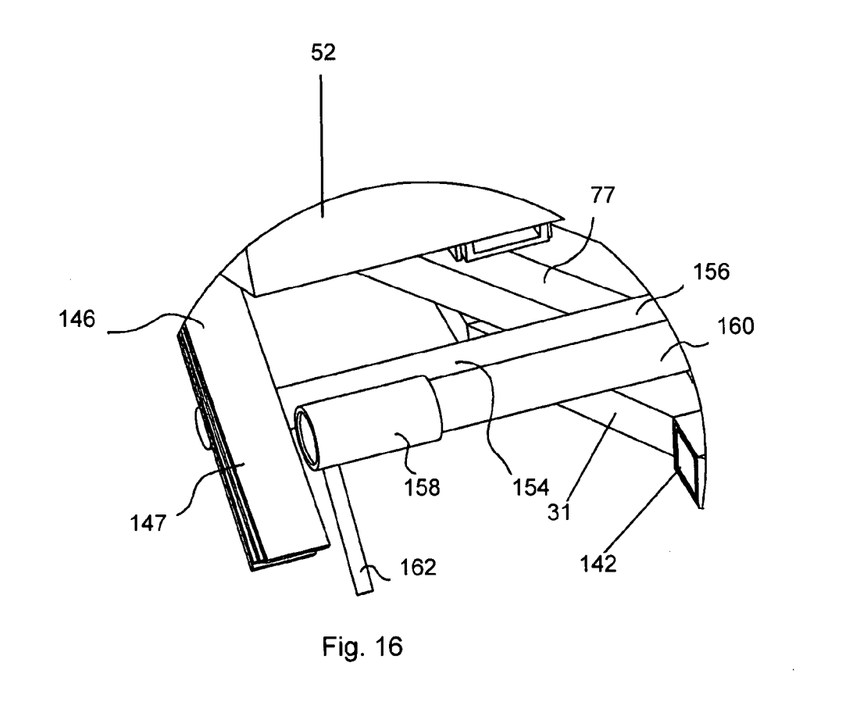
FIG. 16 is a partial front perspective close-up view of the leaf spring engaging the spring slider at the right side of the tow trailer as shown in circle A of FIG. 7 and rotated downward from a top plan view and viewed toward the back.

Leaf springs 146 fasten to the bottom of the each base arm 50 of the base assembly 18 forward the wheel assembly 22 and preferably forward the base conduit 56. Each leaf spring 146 has multiple leaves, preferably three or four leaves 147 stacked and fastened to the base arm 50 at the attachment end 148. The unconnected leaves end 150 hangs over a lateral end 152 of a spring slider 154. (FIG. 16.)

The spring sliders 154 have a spring bar 156 attached to spring cylinders 158, 159. Each spring cylinder 158, 159 engages a pivot bar 160. The lateral spring cylinder 158 has an outwardly extending spring handle 162. The spring cylinders 158, 159 slide on the pivot bar 160 until reaching a spring stop 164, such as a ridge 166. The ridge 166 is located near the center and/or the lateral end of the pivot bar 160. The pivot bar 160 attaches to the top of the horizontal backstop brace 80 between the upright brace 76 and the nub 81.

A lifting device, such as a hydraulic cylinder 168, pivotally mounts to an upper hydraulic bracket 170 attached to the base assembly 18 at the center of the cross base 52 to allow the hydraulic cylinder 168 to pivot about the upper bracket 170. The hydraulic cylinder 168 has no bending moment as the hydraulic cylinder 168 raises the forward end of the base assembly 18. The hydraulic cylinder 168 mounts to a lower hydraulic bracket 171 attached to the lower bracket support 30 of the fork assembly 16. Although a hydraulic cylinder is preferred, it will be clear to those skilled in the art that a winch or other lifting devices could be used.

The hydraulic cylinder is of a standard commercially available design, selected to have a lifting capacity sufficient to raise the forks of the loaded tow trailer, and a stroke of sufficient length to provide adequate ground clearance for the tow trailer. The hydraulic cylinder 168 is in fluid communication with a hydraulic pump 186 with an actuator attached to one side of the hitch 14, or in any other conveniently accessible location. The hydraulic pump 186 fastens to a pump bracket at the top of the hitch 14 behind a jack assembly 188. The hydraulic pump 186 receives power from the battery 184, or alternatively, may be connected to a power outlet supplied on the tow vehicle.

When the fork assembly 16 and base assembly 18 are in an upper position and the spring slider 154 is rotated rearward, the unconnected end 150 of the leaf spring 146 are separated from the spring slider 154 and open. When the fork assembly 16 and base assembly 18 are in a lower position and the spring slider 154 is rotated forward, the leaves 147 of the leaf spring 146 engage the spring slider and nest together.

The tow trailer assemblies and braces are preferably rectangular or square steel tubing of sufficient structural strength to support the loaded tow trailer assembly during transit.

In operation, the tow trailer couples with a towing vehicle using the hitch with or without the hitch extension. The hydraulic cylinder is lowered to a fully retracted position. The forks and fork receivers are positioned essentially horizontally and raised slightly above the ground. The tow trailer is towed to a position immediately in front of the cargo to be transported, and then moved backward such that the forks penetrate the pallet or slide under the cargo load. The tow trailer is moved backward until the forward end of the pallet or cargo load contacts the backstop indicating that the cargo is properly positioned over or slightly in front of the pivot axis. In order to provide a stable towing configuration, the load should be positioned on the forks such that its center of gravity is not behind the pivot axis. Such a loading configuration could cause the rear of the fork assembly to pivot downwardly about the pivot axis, resulting in an upward force on the hitch, and potentially uncoupling the tow trailer from the tow vehicle. By configuring the backstop, the forks and the base assembly as described above, the present invention properly positions the load's center of gravity in a stable towing configuration between the pivot axis and the hitch.

Once the cargo has been properly engaged, the tow trailer is moved to its raised or transport position. The operator activates the pump using the hydraulic actuator, thus causing the hydraulic cylinder to extend and move the base assembly's cross base upward relative to the lower bracket support of the fork assembly. As the cross base is raised, the base assembly pivots about the pivot axle in a scissors-like fashion to move the forks upwardly relative to the wheels. Because the downward motion of the wheels is constrained by the ground, this motion causes the fork assembly to pivot upward about the hitch axis, thus raising the forks above the ground.

Because the entire length of the fork assembly pivots, a small angle of inclination of the fork assembly raises the forks to meet the ground clearance requirements without inclining the cargo so steeply as to cause the load to shift or fall from the tow trailer. Once the tow trailer is fully raised, locking straps can be installed on lugs located on the base assembly's cross base and the lower bracket support. Locking pins are inserted into holes in the lugs. The hydraulic pump and the hydraulic cylinder are deactivated. The motor vehicle tows the tow trailer to the destination where the above sequence of operations is reversed to unload the cargo.

Once the cargo is unloaded, the modular tow trailer is ready to be disassembled for shipment with the cargo. The wheel assemblies unlock from the base arms of the base assembly by removing the wheel locking pins from the wheel holes and base holes and slide out of the base arms. The wheel arms slide into the wheel channels and lock in place with the stop lock releasably engaging the wheel arms and the channel stop. The wheels can rest on the fork receivers.

The forks unlock from the fork receivers by releasing the fork locks, such as by removing the fork locking pins. The forks are placed into the fork storage receptacles, preferably with the heads inserted into the fork storage receptacles and the tail extending outward. The tip of the heads project outside of the fork storage receptacles. Preferably, the forks are locked into the fork storage receptacles using the storage lock.

If desired, the tie down sliders can be pushed farther into the horizontal tie down with the lateral plates moved down or removed from the horizontal tie downs. Alternatively, the horizontal tie downs can be removed from the back stop by releasing from the tie down lock and stored. The tongue and hitch extension can be removed from the hitch and placed onto the cargo container or pallet. Alternatively, the tongue can be stored in the axle support frame.

The modular tow trailer of the invention has a number of advantages. After loading cargo at one location, one person can easily disassemble the tow trailer, such as by removing the wheel assembly and forks. The partially disassembled tow trailer has a compact size and transports with the rest of the cargo to a second location. The partially disassembled tow trailer easily fits within a standard cargo container for shipping with the cargo or storage. Once unloaded at the destination site, one person can easily reassemble the tow trailer for loading cargo.

The leaf springs provide a smoother ride for the cargo. If the loaded tow trailer were to drop down due to a dip or bump in the transport path, the unattached end of the leaf spring compresses against the spring slider. The unattached leaves then push the front end of the base assembly upward to smooth the ride. When the tow trailer is not towing cargo, the position of the spring slider can be changed to lock the leaf springs in place.

The tow trailer can transport larger cargo loads without the need for forklifts or a large flatbed truck and can carry these larger loads a distance above the ground sufficient to comply with Department of Transportation ground clearance regulations without tilting the load so far beyond the horizontal position that the cargo falls off of the pallet.

The backstop limits the insertion of the forks into the pallet or under the shipping container to ensure proper positioning of the load. In this manner, the weight of the load is centered over the forks, or slightly forward of the wheels of tow trailer and the loaded tow trailer is stable.

Once the pallet and cargo are in position, the tow trailer can safely travel at highway speeds. The tow trailer has the ability to load and unload the standard pallet under its own power, with the ability to transport on rough terrain or on the highway. The tow trailer can haul large and oversized cargo when attached to a car, pickup, Humvee or other truck using a standard ball or pintle hitch. If a pintle hitch is used, the ball adapted tongue can be stored in the supplemental vertical axle support. At the destination site, the forks can be raised up to ten feet for loading and/or unloaded cargo.

While the invention is shown in only one of its forms, it is not thus limited but is susceptible to various changes and modifications without departing from the spirit and scope of the invention.

What is claimed is:

1. A tow trailer assembly for use with a motor vehicle, comprising:

a fork assembly having a pair of parallel diagonal fork braces, fork receivers connecting to the diagonal fork braces, and a fork cross tie connecting between the fork receivers;

forks releasably matingly engaging the fork receivers;

a backstop having a pair of uprights mounting to the fork receivers;

a horizontal tie down releasably connecting to the uprights;

a base assembly having a cross base between a pair of parallel base arms;

a wheel assembly having a wheel arm releasably matingly engaging one of the base arms;

a pivot axle having opposite lateral ends rotatingly engaging the base arms;

an axle support frame mounting to each fork receiver and rotatingly engaging the pivot axle;

a lifting device being mounted to the base assembly and the fork assembly;

a hitch attaching to the fork assembly, the hitch having a plurality of tongue receivers stacked vertically, a transverse hitch member, and diagonal hitch members attaching to the transverse hitch member and one of the tongue receivers;

a leaf spring attaching at an attachment end directly to the bottom of each base arm forward the wheel assembly;

horizontal backstop braces attaching to the backstop;

a pivot bar attaching to the horizontal backstop braces; and a spring slider slidingly engaging the pivot bar.

2. The tow trailer assembly of claim 1, wherein the leaf spring engages the spring slider.

3. The tow trailer assembly of claim 1, further comprising:
diagonal backstop braces attaching to the horizontal backstop brace and the axle support frame; and
a wheel channel being supported by the diagonal backstop brace.

4. The tow trailer assembly of claim 3, further comprising:
fork storage receptacles mounted to the fork cross tie.

5. The tow trailer assembly of claim 4, further comprising:
a hitch extension matingly engaging one of the tongue receivers of the hitch.

6. The tow trailer assembly of claim 3, further comprising:
upright braces extending from the horizontal backstop braces to the uprights.

7. The tow trailer assembly of claim 3, wherein the axle support frame further comprises:
a vertical axle support mounting to the upright;
a horizontal axle support attaching to the vertical axle support and the pivot axle; and
a diagonal axle support attaching to the vertical axle support and the horizontal axle support.

8. A tow trailer assembly for use with a motor vehicle, comprising:
a fork assembly having a pair of parallel diagonal fork braces, fork receivers connecting to the diagonal fork braces, and a fork cross tie connecting between the fork receivers;
fork storage receptacles mounted to the fork cross tie;
a backstop having a pair of uprights mounting to the fork receivers;
a horizontal tie down releasably connecting to the uprights;
a base assembly having a cross base between a pair of parallel base arms;
a pivot axle having opposite lateral ends rotatingly engaging the base arms;
an axle support frame mounting to each fork receiver and rotatingly engaging the pivot axle;
horizontal backstop braces attaching to the backstop;
diagonal backstop braces attaching to the horizontal backstop brace and the axle support frame;
a wheel channel being supported by the diagonal backstop brace;
a lifting device being mounted to the base assembly and the fork assembly;
a hitch attaching to the fork assembly, the hitch having a plurality of tongue receivers stacked vertically, a transverse hitch member, and diagonal hitch members attaching to the transverse hitch member and one of the tongue receivers;
a leaf spring attaching at an attachment end to the bottom of each base arm forward the wheel assembly;
a pivot bar attaching to the horizontal backstop braces; and
a spring slider slidingly engaging the pivot bar.

9. The tow trailer assembly of claim 8, further comprising:
a wheel assembly having a wheel arm releasably locking within the wheel channel.

10. The tow trailer assembly of claim 9, further comprising:
forks removably engaging the fork storage receptacles.

11. The tow trailer assembly of claim 10, further comprising:
upright braces extending from the horizontal backstop braces to the uprights.

* * * * *